US011704853B2

(12) United States Patent
Borer et al.

(10) Patent No.: US 11,704,853 B2
(45) Date of Patent: Jul. 18, 2023

(54) TECHNIQUES FOR FEATURE-BASED NEURAL RENDERING

(71) Applicant: DISNEY ENTERPRISES, INC., Burbank, CA (US)

(72) Inventors: Dominik Tobias Borer, Zurich (CH); Martin Guay, Zurich (CH); Jakob Joachim Buhmann, Zurich (CH); Robert Walker Sumner, Zurich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 0 days.

(21) Appl. No.: 16/511,961

(22) Filed: Jul. 15, 2019

(65) Prior Publication Data

US 2021/0019928 A1   Jan. 21, 2021

(51) Int. Cl.
*G06T 13/40* (2011.01)
*G06N 20/00* (2019.01)
*G06F 17/15* (2006.01)
*G06N 3/04* (2023.01)
*G06T 19/00* (2011.01)

(52) U.S. Cl.
CPC ............. *G06T 13/40* (2013.01); *G06F 17/15* (2013.01); *G06N 3/04* (2013.01); *G06N 20/00* (2019.01); *G06T 19/006* (2013.01)

(58) Field of Classification Search
CPC ....... G06T 13/40; G06T 19/006; G06N 20/00; G06N 3/04; G06F 17/15
See application file for complete search history.

(56) References Cited

U.S. PATENT DOCUMENTS

| 2005/0203380 | A1* | 9/2005 | Sauer | A61B 34/20 |
| | | | | 600/417 |
| 2012/0223940 | A1* | 9/2012 | Dunstan | A63F 13/52 |
| | | | | 345/419 |
| 2013/0342527 | A1* | 12/2013 | Molyneaux | G06T 17/20 |
| | | | | 345/419 |

(Continued)

FOREIGN PATENT DOCUMENTS

WO   2019/090213 A1   5/2019

OTHER PUBLICATIONS

Chan, Caroline et al., "Everybody Dance Now", Cornell University, Aug. 22, 2018, pp. 1-12. https://arxiv.org/abs/1808.07371.

(Continued)

*Primary Examiner* — Said Broome
(74) *Attorney, Agent, or Firm* — Artegis Law Group, LLP

(57) ABSTRACT

Techniques are disclosed for learning a machine learning model that maps control data, such as renderings of skeletons, and associated three-dimensional (3D) information to two-dimensional (2D) renderings of a character. The machine learning model may be an adaptation of the U-Net architecture that accounts for 3D information and is trained using a perceptual loss between images generated by the machine learning model and ground truth images. Once trained, the machine learning model may be used to animate a character, such as in the context of previsualization or a video game, based on control of associated control points.

19 Claims, 7 Drawing Sheets

(56) References Cited

U.S. PATENT DOCUMENTS

| | | | |
|---|---|---|---|
| 2015/0206341 A1* | 7/2015 | Loper | G06T 17/10 345/420 |
| 2019/0130562 A1* | 5/2019 | Liu | G06K 9/6273 |

OTHER PUBLICATIONS

Extended European Search Report for application No. 20185752.1 dated Dec. 21, 2020.

Sengupta et al., "SfSNet: Learning Shape, Reflectance and Illuminance of Faces 'in the Wild'", 2018 IEEE/CVF Conference on Computer Vision and Pattern Recognition, IEEE, XP033473546, DOI: 10.1109/CVPR.2018.00659, Jun. 18, 2018, pp. 6296-6305.

Hudon et al., "Deep Normal Estimation for Automatic Shading of Hand-Drawn Characters", Advances in Databases and Information Systems; Lecture Notes in Computer Science, Springer International Publishing, Cham, XP047501164, ISBN: 978-3-319-10403-4, Jan. 23, 2019, pp. 246-262.

Nestmeyer et al., "Structural Decompositions for End-to-End Relighting", arxiv.org, arxiv:1906.03355, XP081374721, Jun. 8, 2019, 17 pages.

Partial European Search Report for application No. 20185752.1 dated Oct. 12, 2020.

Liu et al., "Neural Animation and Reenactment of Human Actor Videos", arxiv:1809.03658, XP081081387, vol. 1, No. 1, Article 282, Sep. 11, 2018, pp. 282:1-282:13.

Zakharov et al., "Textured Neural Avatars" arXiv, XP055731671, Retrieved from the Internet: URL:https://www.researchgate.net/profile/Karim Iskakov/publication/333259973 Textured Neural Avatars/links/5ce8f16092851c4eabb-c5576/Textured-Neural-Avatars.pdf, May 21, 2019, pp. 1-12.

Varol et al., "Learning from Synthetic Humans", XP081305231, DOI: 10.1109/CVPR.2017.492, arxiv:1701.01370, Jan. 5, 2017, pp. 1-10.

\* cited by examiner

TECHNIQUES FOR FEATURE-BASED NEURAL RENDERING

BACKGROUND

Technical Field

Embodiments of the present disclosure relate generally to image rendering and, more specifically, to techniques for feature-based neural rendering.

Description of the Related Art

Feature animation films generally include high-definition, high-fidelity characters. Typically, such characters are animated using high-resolution models and textures as well as complex proprietary rigs and deformation algorithms.

The characters from feature animation films are not easily adaptable to real-time applications, such as computer-based games and previsualation. Previsualization, also referred to herein as "previs," is the visualization of scenes prior to final animation or filming. For example, motion capture with a single camera may be employed to visualize a character's movement in the early stages of story authoring and storyboarding. Rendering engines used in real-time applications typically support only linear blend skinning and blend shapes, not the proprietary rigs and deformation algorithms used to render feature animation films. Further, real-time rendering engines may require lower-resolution models and textures.

Currently, no effective techniques exist for decimating or otherwise exporting the high-definition, high-fidelity assets used in feature animation films to low-resolution assets compatible with real-time rendering engines. As a result, low-resolution assets, such as characters re-modeled with fewer polygons, re-textured with lower-resolution materials, and re-rigged with only skeletal linear blend skinning and blend shapes, need to be created manually from scratch. The creation of such low-resolution assets can be time consuming and labor intensive. Additionally, manual effort is required to set up a character to be compatible with different sources of motion.

As the foregoing illustrates, what is needed in the art are more effective techniques for rendering high-resolution characters in real-time applications.

SUMMARY

One embodiment of the present application sets forth a computer-implemented method for rendering an image. The method includes determining pose information for a first character based on a control signal, and processing the pose information using a trained machine learning model to generate a rendering of the first character.

Another embodiment of the present application sets forth a computer-implemented method for training a machine learning model. The method includes receiving training data that includes a plurality of rendered images and an associated set of control points for each rendered image. The method further includes training the machine learning model based on a perceptual loss between one or more images generated by the machine learning model and one or more associated rendered images included in the training data.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that, in the disclosed techniques, a machine learning model is implemented that translates control points to two-dimensional (2D) rendered images, without requiring full resolution geometry or proprietary rigs or deformers. As a result, computer graphics (CG) characters, including high-resolution characters traditionally limited to feature animation films, can be controlled or puppeteered using 2D (or 3D) control points, such as a skeleton. Examples of real-time applications of techniques disclosed herein include (1) previs, in which, e.g., motion capture data from a single camera can be fed into a machine learning model to generate renderings of a character; and (2) computer-based games. Further, a perceptual loss for training the machine learning model is disclosed that converges successfully more often than traditional discriminators used in adversarial learning. In addition, a common interface is disclosed that permits different sources of motion to be transformed to the common interface and input into a machine learning model that renders 3D characters. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Figure 1:
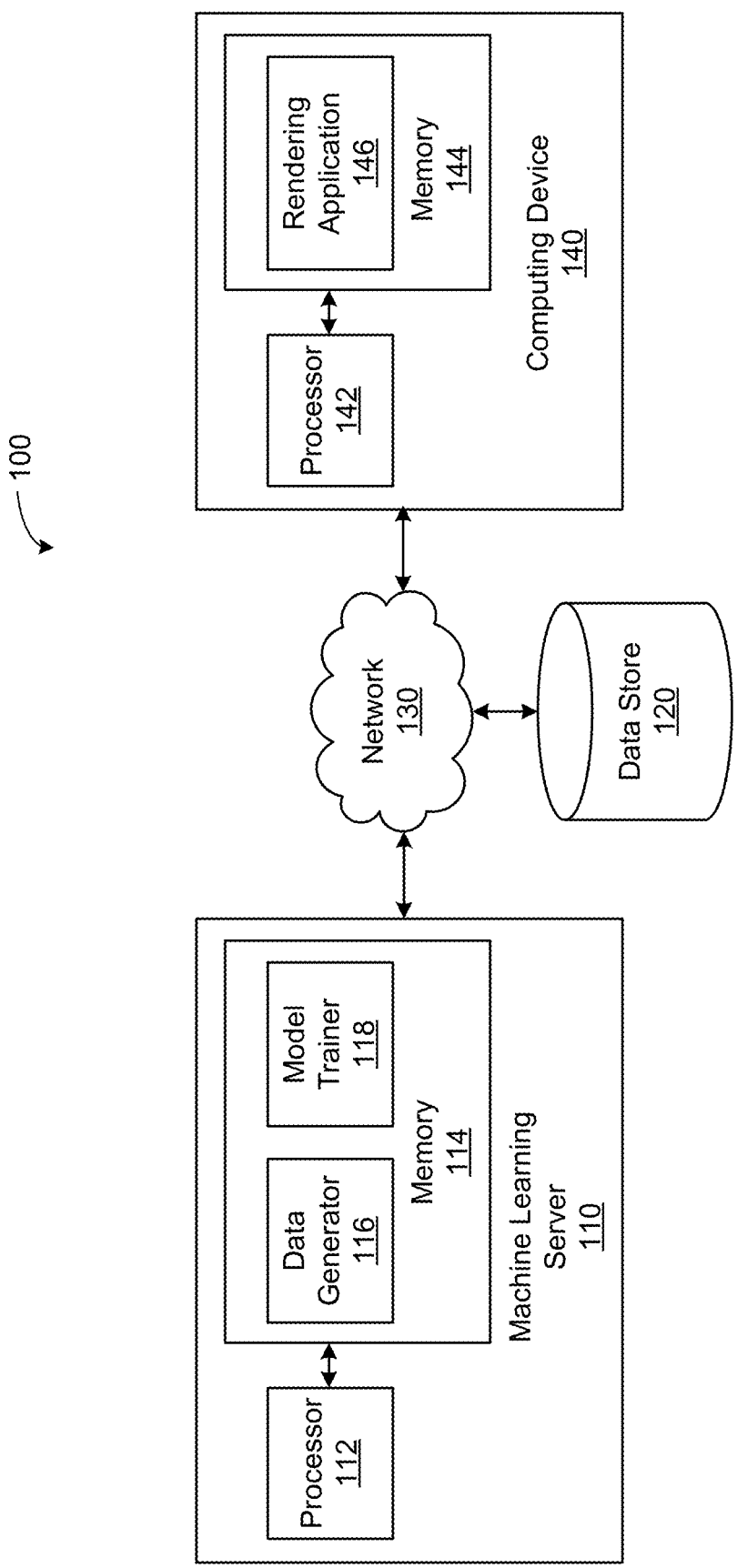
FIG. 1 illustrates a system configured to implement one or more aspects of various embodiments.

FIG. 1 illustrates a system 100 configured to implement one or more aspects of various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a data generating application 116 ("data generator") executes on a processor 112 of the machine learning server 110 and is stored in a memory 114 of the machine learning server 110. Although shown as a server for illustrative purposes, it should be understood that the machine learning server 110 is not required to be a server and may generally be any type of computing system. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a GPU that incorporates circuitry optimized for graphics and video processing, including, for example, video output circuitry. The GPU may deliver pixels to a display device that may be any conventional cathode ray tube, liquid crystal display, light-emitting diode display, or the like.

A system memory 114 of the machine learning server 110 stores content, such as software applications and data, for use by the CPU 112 and the GPU. The system memory 116 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 116. The storage may include any number and type of external memories that are accessible to the CPU 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of CPUs 112, the number of GPUs, the number of system memories 114, and the number of applications included in the system memory 114 may be modified as desired. Further, the connection topology between the various units in FIG. 1 may be modified as desired. In some embodiments, any combination of the CPU 112, the system memory 114, and a GPU may be replaced with any type of virtual computing system, distributed computing system, or cloud computing environment, such as a public or a hybrid cloud.

As discussed in greater detail below, the data generator is configured to generate training data based on a three-dimensional (3D) model and animation data. In some embodiments, the data generator 116 may be any suitable renderer or software toolset that renders the 3D model in various poses based on the animation data. Examples of renderers include the RenderMan® and Hyperion renderers. In particular, the rendered images may depict a character in poses corresponding to poses of a two-dimensional (2D) skeleton or other control points, and the data generator 116 may generate multiple renderings of the character in different poses and views. As used herein, a control point, which is also sometimes referred to as a "handle," is a position that can be controlled to update the pose of a character. A skeleton is one example of a set of control points, in which the position and rotation angles of various joints in the skeleton may be adjusted or manipulated to achieve a desired character pose.

The data generator 116 saves the images it renders, as well as related data such as masks, normal maps, and depth maps generated along with the rendered images and 2D skeleton pose information associated with the rendered images, to use as training data. Based on such training data, a model training application 118 ("model trainer") that also resides in the memory 114 and executes on the processor 112 trains a machine learning model that takes as input 2D (or 3D) pose information, such as a rendering of control points (e.g., a skeleton), and outputs a corresponding rendering of the character, as well as a mask and normal map, and optionally a depth map. The architecture of the machine learning model and techniques for training the same are discussed in greater detail below.

Training data and/or trained machine learning models may be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120. In embodiments, the data store 120 may include one or more databases. As such, system 100 may include a database management system (DBMS) for accessing and storing data in the data store 120.

Trained machine learning models may be deployed to applications that render images of characters using such machine learning models. Illustratively, a rendering application 146 is stored in a memory 144, and executes on a processor 142, of the computing device 140. Components of the computing device 140, including the memory 144 and processor 142 may be similar to corresponding components of the machine learning server 110 and will not be described in detail herein for conciseness. As discussed in greater detail below, the rendering application 146 may receive a control signal, such as a joystick signal or a video, that controls control points such as a 2D skeleton. The rendering application 146 is configured to (optionally) transform such a control signal to the format of a common interface that the rendering application 146 feeds to the trained machine learning model, which in turn outputs a rendering of a character based on the input. The machine learning model may also output a mask and a normal map (and optionally a depth map), which may be used to compose the rendering of the character into a scene. As a result, a computer graphics (CG) character can be controlled or puppeteered using a 2D (or alternatively, a 3D) skeleton.

The number of machine learning servers and application servers may be modified as desired. Further, the functionality included in any of the applications may be divided across any number of applications or other software that are stored and execute via any number of devices that are located in any number of physical locations.

Figure 2:
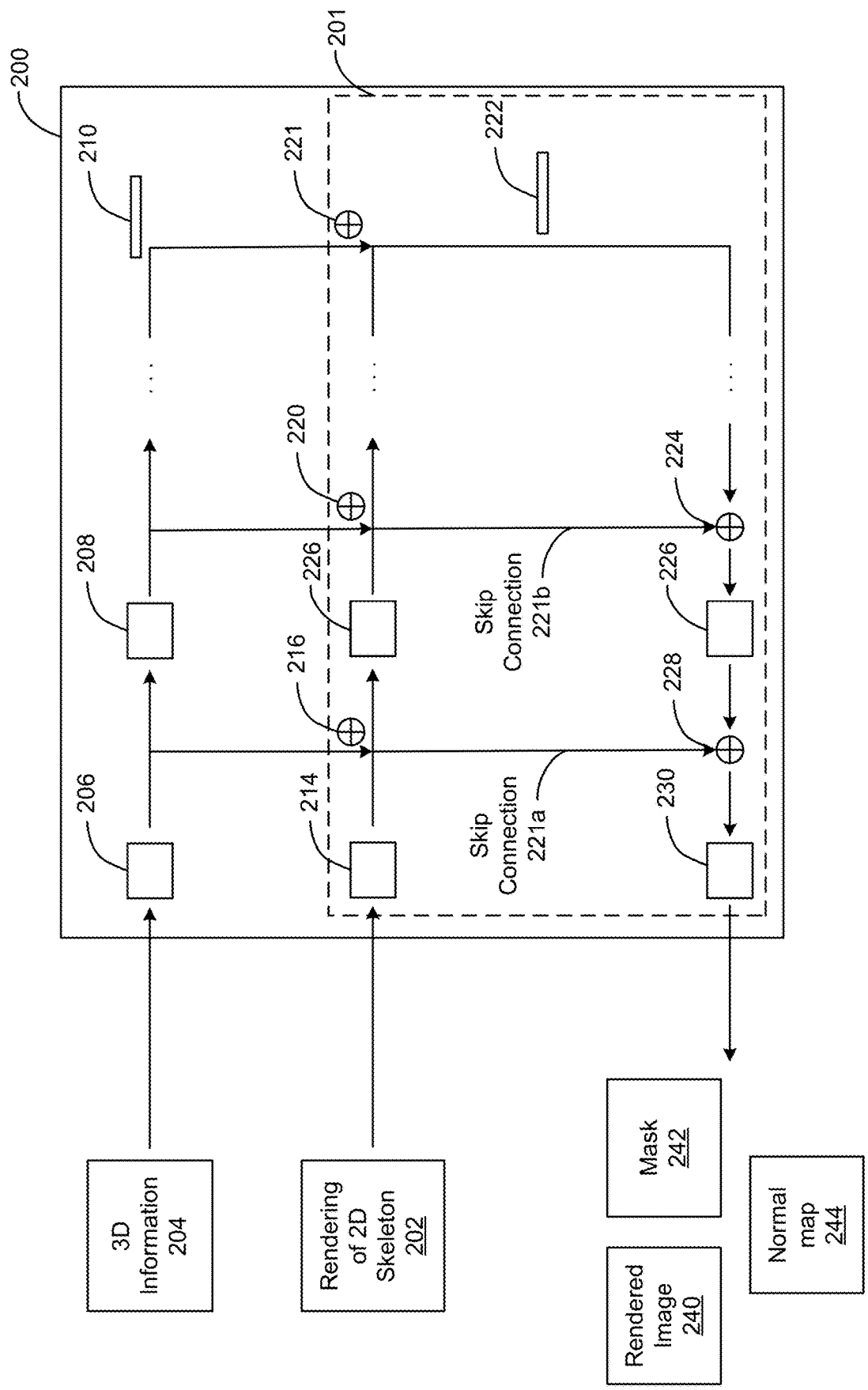
FIG. 2 illustrates an exemplary architecture of a machine learning model, according to various embodiments.

FIG. 2 illustrates an exemplary architecture of a machine learning model 200, according to various embodiments. Although a particular architecture of the machine learning model 200 is shown for illustrative purposes, it should be understood that, in other embodiments, any technically feasible machine learning model may be trained and used to render images depicting characters.

As shown, the machine learning model 200 receives a rendering of a 2D skeleton 202 and associated 3D information 204 as inputs. Although the rendering of the 2D skeleton 202 and the 3D information 204 are shown as examples, in other embodiments any suitable 2D or 3D control points and associated 3D information may be taken as input, and the input may further be defined by a common interface, as discussed in greater detail below. The machine learning model 200 is configured to translate the rendering of the 2D skeleton 202 (or other 2D or 3D control points) into a rendered image 240 depicting a character in the same "pose" as the 2D skeleton, as well as an associated mask 242 and normal map 244 (and optionally a depth map), which are discussed in greater detail below.

As shown, the machine learning model 200 is a modification of a 2D U-Net architecture 201 with skip connections that incorporates 3D information 204, when such information is available. U-net is an encoder-decoder architecture traditionally used for image translations. Experience has shown that using the rendering of the 2D skeleton 202 alone, without the 3D information 204, admits ambiguities, as the same 2D skeleton can correspond to multiple 3D skeletons. Such ambiguities can, in turn, cause visual artifacts in the rendered image 240, as the machine learning model 200 attempts to "average" the different 3D possibilities. Incorporating the 3D information 204 can solve this problem. For example, in some embodiments, the 3D information 204 that the machine learning model 200 receives may include volumes of occupancy, slices of positions, orientations, and/or depth, etc. Ideally, the 3D information 204 should include position and orientation information. As discussed in greater detail below, the machine learning model 200 may also be trained differently from the traditional U-Net encoder-decoder, using a perceptual loss between a generated image and a ground truth image rather than the traditional discriminator used in adversarial learning.

Illustratively, the 2D U-Net architecture 201 includes a number of decreasing blocks of encoding, including blocks and 214 and 216. The blocks of encoding are blocks of convolutions that each reduces the image size by, e.g., 2, with the blocks creating a set of various versions of an input image as the image is transformed. The versions of the input are also referred to herein as "features." After each encoding block, a skip connection, such as the skip connections 221a and 221b, is linked to the decoding layers, which permits the reconstruction by the decoding layers to benefit from processed information from the encoding. The encoding ultimately produces a sequence of 1×1, i.e., scalar features 222. Such a sequence of 1×1 features 222 may then be reconstructed by the decoding layers, which as shown includes a number of blocks of decoding, including blocks 226 and 230. As described, the decoding may reuse the information from the skip connections to help in the reconstruction process. During the decoding, the sequence of 1×1 features 222 from the bottleneck passes through successive deconvolutions that expand the resolution of the features from, e.g., 1×1, to 2×2, to 4×4, etc. Each time, the features are further concatenated with the features from the encoding process received via the skip connections. Doing so re-uses some of the features that may be required to know, e.g., the orientations of limbs, etc.

For example, assume the rendering of the 2D skeleton 202 is a 256×256 pixel image (it should be understood, however, that the rendering 202 may generally be of any size). In such a case, the U-Net architecture 201 in the machine learning model 200 could include eight decreasing blocks of encoding, each of which includes a 4×4 convolution with stride 2 followed by a 3×3 convolution with stride 1, and further followed by a non-linear activation function. Encoding begins with 64 convolutions and increases to 512 as the filter size is reduced. As described, a skip connection may also be linked to the decoding layers after each such encoding block, and the result of encoding in this case may be a sequence of 1×1 features of length 512.

In a particular embodiment, the U-Net architecture 201 in the machine learning model 200 may include eight layers of encoding from a 256×256 resolution rendering of the 2D skeleton 202 to the sequence of 1×1 features 222, and a further eight layers that decode the 1×1 features 222 back to the 256×256 rendered image 240, the mask 242, and the normal map 244. In such a case, the eight layers of the encoder may be: C64-C128-C256-C512-C512-C512-C512-C512, and the eight layers of the decoder may be: C512-C512-C512-C512-C256-C128-C64.

As described, the 2D U-Net architecture 201 is adapted in embodiments to account for the 3D information 204, which as described may include, e.g., volumes of occupancy, slices of positions, orientations, and/or depth, etc. For example, the 3D information 204 could include volume of occupancy, with volumes occupied by a character represented by 1 and the remaining volumes represented by 0. As another example, the 3D information 204 could include multiple slices indicating the x, y, and z components of each joint of the 2D skeleton. As yet another example, the 3D information 204 could include a depth map indicating the depth of every pixel in the rendering of the 2D skeleton 202. In a further example, the 3D information 304 could include slices that provide 3D orientation information.

In some embodiments, the 2D U-Net architecture 201 may be informed (i.e., augmented), via skip connections, by 3D processed features. As shown, the 3D information may be reduced along the x and y dimensions, which also reduces the 3D information in the z dimension, by a number of encoder blocks, such as encoder blocks 206 and 208. That is, as the x-y image dimensions are reduced by the 3D encoder blocks, the depth information is also reduced. For example, the depth slices may be reduced by 2 every time the encoding reduces the x, y dimensions by half. The result of the encoding is 1×1×1 features 210 at the bottleneck. After each block of encoding, the processed features are concatenated with outputs of corresponding encoding blocks of the 2D U-Net architecture 201 at, e.g., 216 and 220. That is, the 2D U-Net architecture 201 is augmented by the 3D processed features via skip connections that concatenate the features. In particular, the 2D skeleton 202 and 3D information 204 pass through separate convolution layers, but skip connections are used to concatenate the 3D and 2D features. Doing so may help in the encoding and decoding process, as the 3D information may help remove ambiguities that could otherwise cause artifacts in the final rendering if only 2D information were used. As shown, the processed features are further passed down to the reconstruction units (e.g., the blocks 226 and 230) to be concatenated with other features to provide additional 3D-related features to aid the reconstruction. It should be noted, however, that 3D volumes or information do not need to be reconstructed, as the machine learning model 200 may only reconstruct the 2D rendered image 240, mask 242, normal map 244, etc.

As a specific example, assume the 3D information 204 is 3D volumetric input in the form of a volumetric occupancy map of $256^3$, or multiple 256×256 images, which may be, e.g., slices indicating the scalar occupancy of the joints, slices indicating the x, y, and z components of each joint of a 3D skeleton, slices that provide 3D orientation, or any other suitable 3D information, as described above. Then, the encoding blocks 206, 208, etc. may include volumetric convolutional filters that encode and reduce in all three dimensions, yielding arrays of volumetric features. For example, the first encoding block 206 may be a $C^3$64 volumetric convolution encoding block that produces $128^3 \times 64$ features, the second encoding block 208 may be a $C^3$128 volumetric encoding block that produces $64^3 \times 128$ features, etc. In such a case, the volumetric convolution filters may include the following volumetric convolutions, denoted by $C^3$: $C^3$64-$C^3$128-$C^3$256-$C^3$512-$C^3$512-$C^3$512-$C^3$512. Each of these volumetric convolutions reduces all dimensions (x, y, and z) by 2, proceeding all the way down to a $1 \times 1 \times 1 \times 512$ (i.e., $1^3 \times 512$) sequence of features. In some embodiments, the features output by the volumetric convolutions may be concatenated with feature outputs of corresponding encoding modules (e.g., the encoding blocks 214, 216, etc.) of the 2D U-Net architecture 201 at symmetric resolutions (e.g., $128^3 \times 64$ with corresponding $128^2 \times 64$). Some embodiments may include skip connections to the last reconstruction layers where the final rendering is decoded. Further, the $1^3 \times 512$ sequence of features (corresponding to the sequence of $1 \times 1 \times 1$ features 210) that results from encoding the 3D information may be concatenated with a $1 \times 1 \times 512$ (i.e., $1^2 \times 512$) sequence of features (corresponding to the sequence of $1 \times 1$ features 222) generated by the encoder of the 2D U-Net architecture 201 during input skeleton image encoding, producing a $1^3 \times 1024$ sequence of features as the output of the encoding.

Continuing the example, decoding blocks (e.g., the blocks 230 and 226) may apply successive deconvolutions to the encoded $1^3 \times 1024$ sequence of features, while reusing information from skip connections to help in the reconstruction process, as described above. In particular, volumetric features may be concatenated with planer features during the decoding. For example, the decoding block 230 may be a deconvolution filter that yields $128^2 \times 64$ features that are concatenated with $128^3 \times 64$ volumetric features from the encoding block 206, yielding $128^2 \times 8256$ features. It should be noted that the 3D volumes or information is not reconstructed in some embodiments. Rather, the decoding may only reconstruct the 2D rendered image, mask, normal maps, and (optionally) depth.

As described, the machine learning model 200 outputs the rendered image 240 depicting a character, from which the rendering of a 2D skeleton 202 was translated, as well as the associated mask 242 and normal map 244 (as well as an optional depth map). The mask 242 indicates whether pixels of the rendered image 240 belong to a background or to the character depicted therein. For example, the mask 242 could include pixels whose values are either 0, indicating the background, or 1, indicating the character. It should be understood that the rendering application 146 may use the mask 242 to overlay the character depicted in the rendered image 240 onto different backgrounds. The normal map 244 indicates surface normals in the rendered image 240. For example, the normal map 244 could include a respective vector for each pixel of the character indicating a surface normal direction. It should be understood that the rendering application 146 may use such surface normals to re-light the character depicted in the rendered image 240 in different environments.

In some embodiments, the machine learning model 200 may also output depths of pixels in the rendered image 240 in a depth map. For example, in the context of games, depth information may be used to determine collisions (e.g., 2D collisions) between the rendered character and other visible objects in a 3D scene. By implementing a machine learning model 200 that also predicts depth, synergies within the network may be created, permitting more accurate predictions of the rendered image 240, the mask 242, the normal map 244, and/or the depth map.

Figure 3:
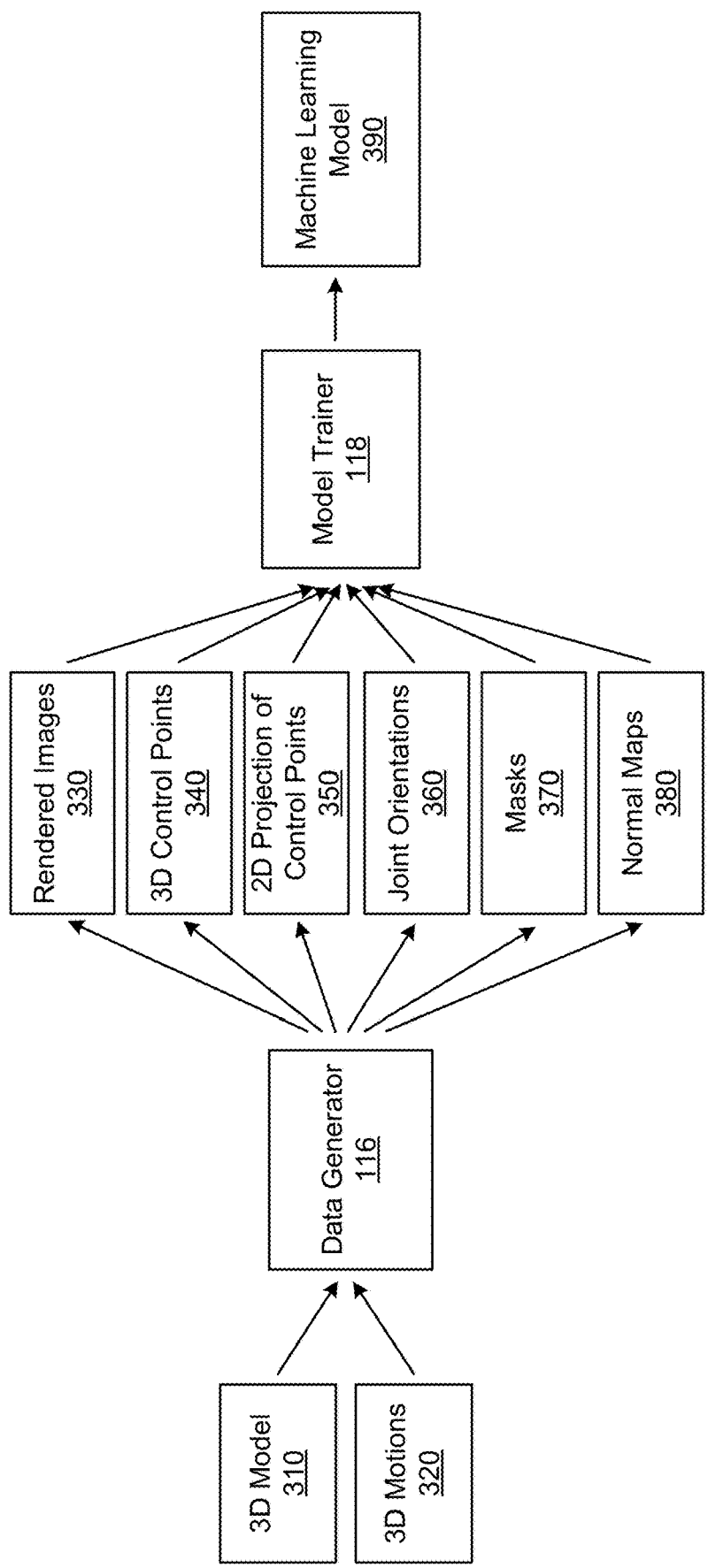
FIG. 3 illustrates an approach for generating a training data set and then training a machine learning model, according to various embodiments.

FIG. 3 illustrates an approach for generating a training data set and then training a machine learning model, such as the machine learning model 200 described above with respect to FIG. 2, according to various embodiments. As shown, the data generator 116 receives as inputs a 3D model 310, which is associated with 3D control points, and a collection of 3D motions 320. For example, the 3D model 310 could be a high-resolution model used in feature animation films. However, the 3D model 310 does not need to be such as a high-resolution model. The data generator 116 combines the 3D model 310 and 3D motions 320 by rendering the character represented by the 3D model 310 in different views and poses, as the 3D model 310 is animated according to the 3D motions 320. As described, the data generator 116 may be any suitable renderer, or software toolset, capable of performing such rendering.

As shown, the data generator 116 outputs the rendered images 330, as well as associated masks 370 and normal maps 380. Optionally, depth information, such as depth maps, may also be output and saved. Ideally, the training data set should include extreme cases and a large variety of poses that covers well the space of poses. When the 3D model 310 is posed using the 3D motions 320, the associated control points are also deformed, as the control points may be parameterized by the surface mesh of the 3D model 310. At runtime, such posing may produce 3D poses in the proportions of a user, as discussed in greater detail below. Illustratively, the data generator 116 also saves the 3D control points 340 after such a deformation, as well as projected 2D positions 350 of those control points 340 and joint orientations 360. In some embodiments, the data generator 116 may go through a database of 3D poses to deform and render the character, while saving the 3D control points 340 and the 2D projected positions 350. In addition, the masks 370, normal maps 380, and depth information (not shown) may be saved as well, which can all be learned by a machine learning model and predicted as a function of the control points.

The joint orientations 360 are rotational values. For example, a wrist joint may store the orientation of the hand, which may be represented as, e.g., angles, matrices (normalized directional vectors), or normalized quaternions. As a particular example, slices may be output by the data generator 116, with each slice being an angle component of the orientation.

As described, the 3D character mesh of the 3D model 310 may be used to parameterize the position and orientation of control points. In some embodiments, a common interface, including 2D or 3D control points, or a skeleton, may be defined. Such a common interface is used to control the trained machine learning model, and various control signals (e.g., a 2D skeleton generated by a pose predictor based on a video, a joystick signal, etc.) may be transformed to the common interface and input into the machine learning model. A weighted average of binding triangle meshes is assumed. A common interface may be defined as a set of control parameters that parameterize the shape of the character. The control parameters in a common interface may include 2D control points, but may also include 3D orientation points (with 3 positions and 3 angles). Further, the control points may be dense (e.g., a mesh) or sparse (e.g., a skeleton). It should be understood that the common interface (e.g., 2D points, 3D points, or skeleton) is how the character is controlled and what the machine learning model is trained on. In some embodiments, a 2D skeleton is often used as the common interface, as image-based pose predictors can be more successfully trained with skeleton data that may include points more strongly correlated to body pixels in an image. Further, the first step of the data generation process may include defining the common interface. For example, the 3D skeleton of a character may need to be parameterized by the shape of the character, such that labeled data can be produced indicating those proportions.

As shown, the model trainer 118, takes as inputs the rendered images 330, 3D control points 340, projected 2D positions 350, joint orientations 360, masks 370, and normal maps 380. In some embodiments, the model trainer 118 may also take as inputs depth maps. Using such inputs as a set of training data, the model trainer 118 learns a mapping between control points and rendered images of the character. The mapping is shown as a trained machine learning model 390, and such a mapping allows the image-based 3D character to be parameterized by the control points. For example, the trained model 390 could have the architecture of the machine learning model 200 described above with respect to FIG. 2.

In some embodiments, the model trainer 118 trains the machine learning model 390 using adversarial learning and a perceptual loss between images generated by the machine learning model 390 and ground truth images (e.g., the rendered images 330). This is in contrast to the traditional discriminator used in adversarial learning to train traditional U-Net architectures, which experience has shown has difficulty converging successfully. The perceptual loss in some embodiments may be defined based on a number of layers of a pre-trained deep neural network that is trained for classification. In such cases, the pre-trained network is used to transform the predicted and ground truth images, with the model trainer 118 essentially attempting to make the predicted and ground truth images close to one another in the "eyes" of the pre-trained network whose layers are used to filter those images. Experience has shown that confining the loss to the lower-resolution filtered images may help achieve convergence during training. For example, the perceptual loss could be the L1 norm of the VGG(M*I) between the predicted and the ground truth image, where M is the mask, I is the image, VGG is the first five layers of a pre-trained VGG (Visual Geometry Group) convolutional neural network, and the L1 norm (also sometimes referred to as the Manhattan Distance or Taxicab norm) between vectors is defined as the sum of the lengths of projections of the line segment between the points onto the coordinate axes. Although the VGG convolutional neural network is used herein as an illustrative example, alternative embodiments may employ one or more layers of other convolutional neural networks or machine learning models. In addition, the model trainer 118 may train the machine learning model 390 using a loss that is simply the L1 norm between the prediction and ground truth for the normal map and mask that the machine learning model 390 is also trained to output.

In some embodiments, the training process may use a subset of the training data to train the machine learning model 390, which is then evaluated using another subset of the training data. For example, a majority of the training data may be used to train the machine learning model, and the remainder of the training data used to evaluate the trained model. Evaluation of trained machine learning models may include validating that the trained models perform sufficiently well (e.g., less than some desired error).

Figure 4:
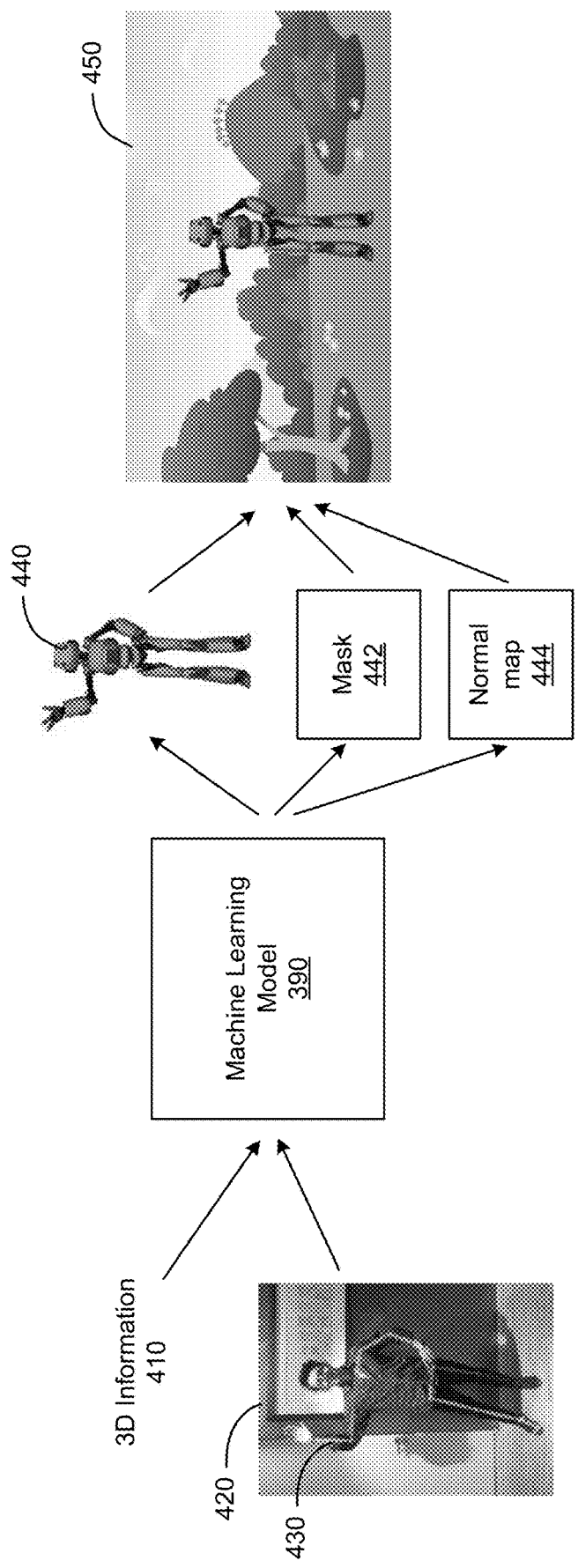
FIG. 4 illustrates an approach for rendering a character using a trained machine learning model, according to various embodiments.

FIG. 4 illustrates an approach for rendering a character using the trained machine learning model 390, according to embodiments. As described, in some embodiments, the rendering application 146 or a user may control a 3D character using a 2D skeleton or other control points. As shown, the rendering application 146 is configured to feed, into the machine learning model 390, a set of such control points, shown as a rendered skeleton 430 derived from an image 420, and associated 3D information 410. In some embodiments, the rendering application 146 may first convert a received control signal to a common interface and input the converted data into the machine learning model 390. For example, the rendering application 146 could determine a 2D or 3D skeleton from a video using a well-known pose prediction technique. Then, the rendering application 146 could re-target the 3D skeleton into the common 3D skeleton by copying joint angles to the common interface, which is then fed into the machine learning model 390. In the case of 2D skeletons, heuristics based on body proportions may adjust the user's skeleton to the proportions of the common interface, which may then be fed into the machine learning model 390.

As described, the machine learning model 390 outputs a rendered image, shown as the rendering of the 3D character 440, along with a mask 442 and a normal map 444, which the machine learning model 390 generates based on the skeleton 430 and the associated 3D information 410. The machine learning model 390 may also (optionally) output a depth map. Rendered images output by the machine learning model 390 may differ from the rendered images 330 used during training in some cases. Typically, if new data points are in between training data points on a manifold, then a trained machine model such as the machine learning model 390 may be able to generalize to the new data points. Conversely, if the new data points lie outside such a manifold and the machine learning model has never seen such data points before, then the machine learning model may be unable to extrapolate. As described, the training data set should include extreme cases and a large variety of poses that covers well the space of poses. Even in the worst case, the machine learning model should be able to find a rendering close by, i.e., a nearest neighbor if the machine learning model is unable to generalize.

Illustratively, the rendering application 146 has used the mask 442 to compose the rendered character into a scene in a rendering 450. For example, the rendered character could be added to an augmented reality (AR) environment. Further, the rendering application 146 may perform some re-lighting by sampling the normal map 444 and computing a product of the sampled normal map with light directions in the new environment. In the context of a computer-based game, the machine learning model 339 may also output depth, and the rendering application 146 could determine collisions between the rendered character and other objects based on such depth when producing the rendering 450. In some embodiments, the machine learning model 339 may render the character with occlusions to support visual interaction with scene objects in a game. As a result, 2D single camera motion capture can be used to produce the rendering 450 of the character overlaid in the scene.

Figure 5:
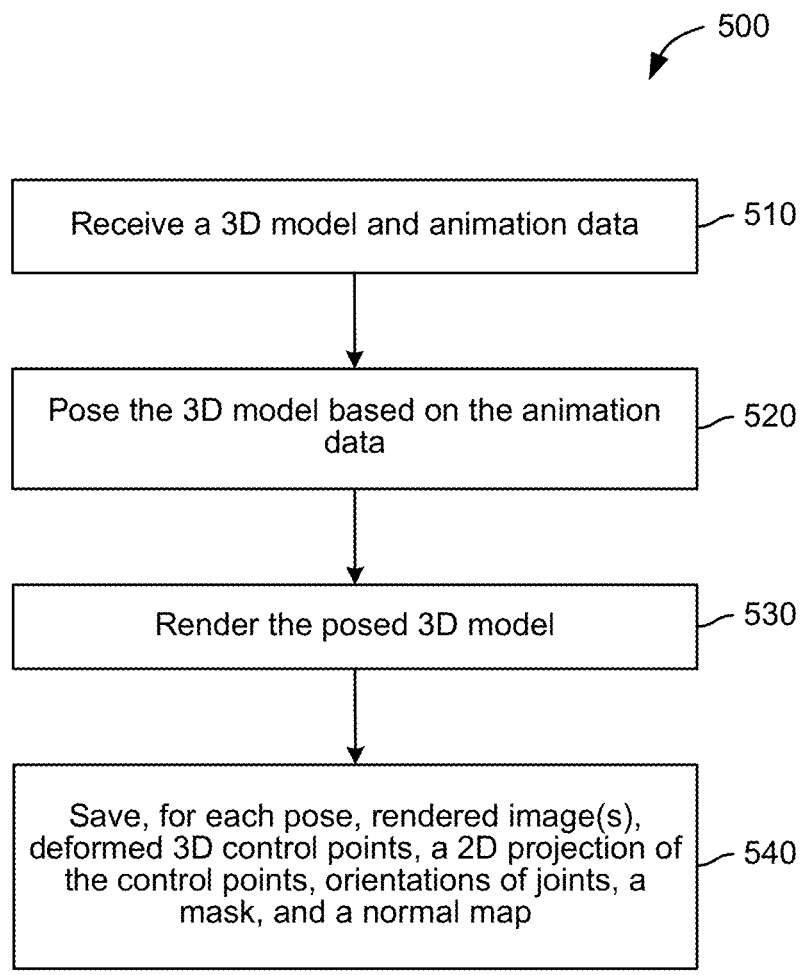
FIG. 5 sets forth a flow diagram of method steps for generating a training data set including rendered characters and associated pose information, according to various embodiments.

FIG. 5 sets forth a flow diagram of method steps for generating a training data set including rendered characters and associated pose information, according to various embodiments. Although the method steps are described in conjunction with the system of FIG. 1, persons of ordinary skill in the art will understand that any system configured to perform the method steps, in any order, is within the scope of the present disclosure.

As shown, a method 500 begins at step 510, where the data generator 116 receives a 3D model and animation data. For example, the 3D model 310 could be a high-resolution model used in a feature animation film. At step 520, the data generator 116 poses the 3D model based on the animation data, and then, at step 530, the data generator 116 renders the posed 3D model. Any suitable 3D rendering technique may be employed to render the posed model. As described, control points associated with the 3D are also deformed when the 3D model is posed, as the control points may be parameterized by the surface mesh of the 3D model.

At step 540, the data generator 116 saves, for each pose of the 3D model, rendered image(s), deformed 3D control points, a 2D projection of control points, and orientations of joints, a mask, and a normal map. As described, the data generator 116 may render the character represented by the 3D model 310 in different views and poses, and the data generator 116 may save such renderings along with other information typically generated by renderers, such as a mask and normal map, as well as the 3D (and projected 2D) control points, and orientation of joints, that are deformed along with the posed 3D model. In addition, a depth map may also be generated and saved in some embodiments.

Figure 6:
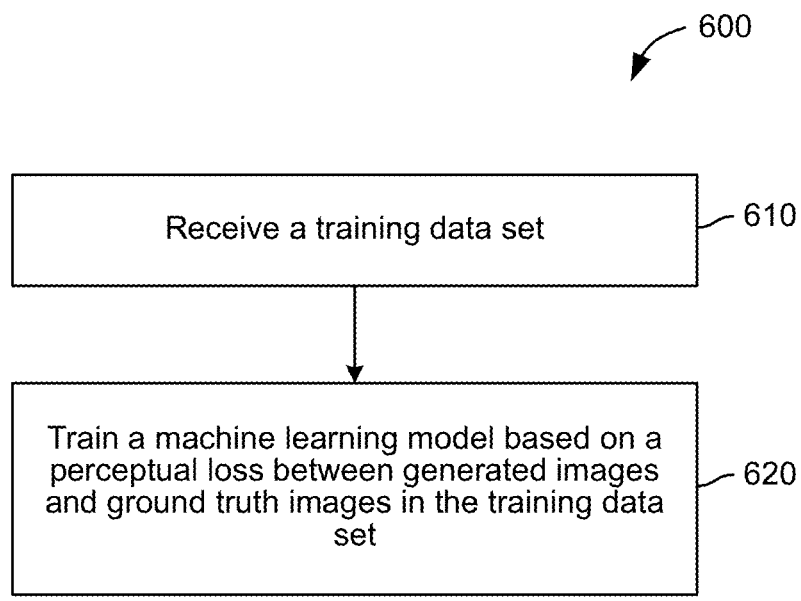
FIG. 6 sets forth a flow diagram of method steps for training a machine learning model to render a character based on pose information, according to various embodiments.

FIG. 6 sets forth a flow diagram of method steps for training a machine learning model to render a character based on pose information. Although the method steps are described in conjunction with the system of FIG. 1, persons of ordinary skill in the art will understand that any system configured to perform the method steps, in any order, is within the scope of the present disclosure.

As shown, a method 600 begins at step 610, where the model trainer 118 receives a training data set. In some embodiments, the training data may include data output by the data generator 116, including a character rendered in different poses and views, together with a mask of the character and control point (e.g., 2D skeleton pose) information. As described with respect to FIG. 5, the data generator 116 may generate rendered images of the character and associated deformed 3D control points, 2D projections of control points, orientations of joints, masks, normal maps, and (optionally) depth maps in some embodiments.

At step 620, the model trainer 118 trains a machine learning model based on a perceptual loss between images that are generated by the machine learning model and ground truth images in the training data set. As described, in some embodiments the model trainer 118 may feed predicted and ground truth images into a pre-trained deep neural network and compute the perceptual loss as a L1 norm between features output by a number of layers of the pre-trained network. In addition, the model trainer 118 may train the machine learning model using a loss that is simply the L1 norm between the prediction and ground truth for a normal map and a mask (and an optional depth map) that the machine learning model is also trained to output.

Figure 7:
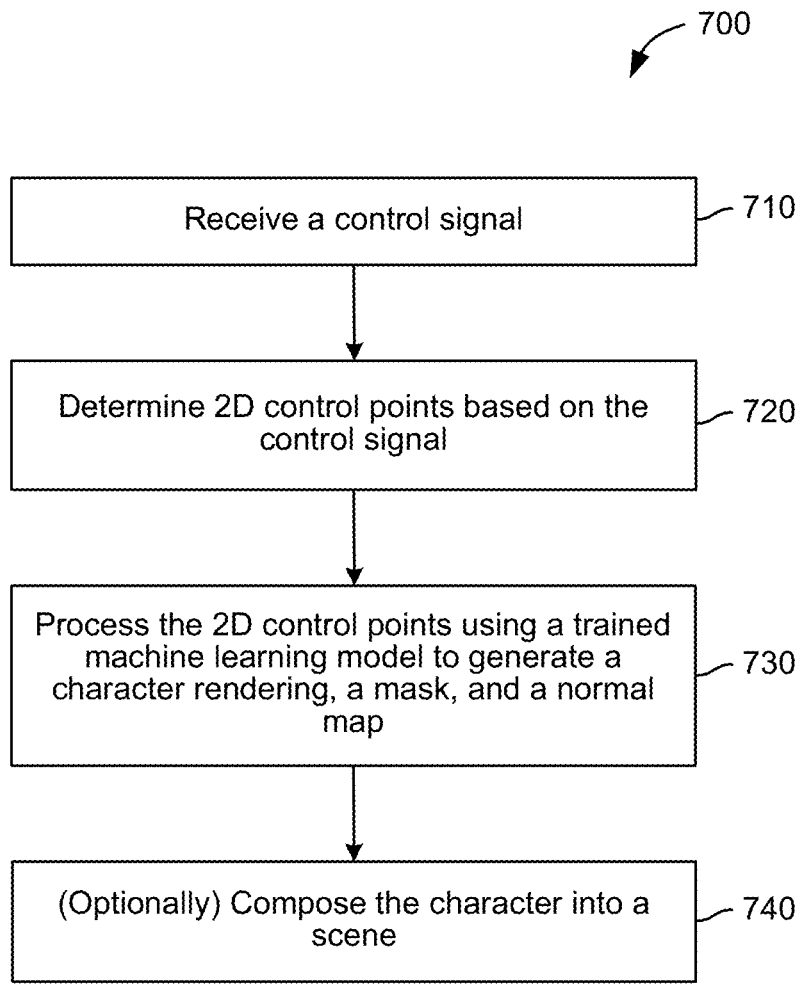
FIG. 7 sets forth a flow diagram of method steps for rendering a character using a trained machine learning model, according to various embodiments.

FIG. 7 sets forth a flow diagram of method steps for rendering a character, according to various embodiments. Although the method steps are described in conjunction with the system of FIG. 1, persons of ordinary skill in the art will understand that any system configured to perform the method steps, in any order, is within the scope of the present disclosure.

As shown, a method 700 begins at step 710, where the rendering application 146 receives a control signal. Any technically feasible signal may be received, such as a video including frames from which a posed skeleton may be extracted, a signal from a joystick used to control a skeleton, etc. For example, in the context of previs, a user may perform in front of a camera, and estimates could be made of 2D and/or 3D skeletons from a video captured by the camera. As another example, in the context of a soccer game in which a developer has used a library of animations of players kicking a ball to train a machine learning model to render 2D depictions of the players kicking the ball, a user could use a joystick to control a 3D or 2D skeleton that in turn controls the rendering of a player. In some embodiments, the game engine may control the 3D or 2D skeleton by blending animation clips. For example, there may be a predefined 3D animation clip for walking forward and another clip for walking to the right, but to turn at a different rate, such as between the full turn right and walking forward, the game engine may blend (interpolate) the forward and right turn clips rather than storing large amounts of animation clips for each possible turning direction. That is, the rendering application 146 may blend and mix animation clips to span a larger range of possible motions with fewer clips.

At step 720, the rendering application 146 determines 2D control points based on the control signal. As described, determining the 2D control points may include transforming the control signal into a common interface for controlling the character using predefined transformation functions. Returning to the example of 3D skeleton poses in the previs case, the rendering application 146 could determine the 2D control points for input into a trained machine learning model by, e.g., rendering the 3D skeleton to a 2D image. In alternative embodiments, the machine learning model may be trained to take as input a 3D skeleton, in which case the 3D skeleton would not need to be projected to 2D.

At step 730, the rendering application 146 processes the 2D control points using a trained machine learning model to generate a rendering of a character, a mask, and a normal map. As described, a machine learning model, such as the adaptation of the U-Net architecture discussed above with respect to FIG. 2, may be trained to output such a rendering, mask, and normal map. Optionally, the machine learning model may also output a depth map.

At step 740, the rendering application 146 (optionally) composes the character into a scene. For example, the rendering application 146 could multiply the mask with the rendered image and place the result in different backgrounds, such as in an AR environment. In addition, the rendering application 146 may perform re-lighting by sampling the normal map and computing a product of the sampled normal map with light directions in a new environment. As another example, in the context of a game, the rendering application 146 could determine collisions between the rendered character and other objects based on depth output by the machine learning model. In some embodiments, the machine learning model may also render the character with occlusions to support visual interaction with scene objects.

In sum, techniques are disclosed for learning a machine learning model that maps control data, such as renderings of skeletons, and associated 3D information to 2D renderings of a character. The machine learning model may be an adaptation of the U-Net architecture that accounts for 3D information and is trained using a perceptual loss between images generated by the machine learning model and ground truth images. Once trained, the machine learning model may be used to animate a character, such as in the context of previs or a video game, based on control of associated control points.

At least one technical advantage of the disclosed techniques relative to the prior art is that, in the disclosed techniques, a machine learning model is implemented that translates control points to 2D rendered images, without requiring full resolution geometry or proprietary rigs or deformers. As a result, computer graphics (CG) characters, including high-resolution characters traditionally limited to feature animation films, can be controlled or puppeteered using 2D (or 3D) control points, such as a skeleton. Examples of real-time applications of techniques disclosed herein include (1) previs, in which, e.g., motion capture data from a single camera can be fed into a machine learning model to generate renderings of a character; and (2) computer-based games. Further, a perceptual loss for training the machine learning model is disclosed that converges successfully more often than traditional discriminators used in adversarial learning. In addition, a common interface is disclosed that permits different sources of motion to be transformed to the common interface and input into a machine learning model that renders 3D characters. These technical advantages represent one or more technological improvements over prior art approaches.

1. In some embodiments, a computer-implemented method for rendering an image that includes at least one character comprises: determining pose information for a first character based on a control signal; and processing the pose information using a trained machine learning model to generate a rendering of the first character.

2. The computer-implemented method according to clause 1, wherein determining the pose information includes rendering a skeleton.

3. The computer-implemented method according to clause 1 or clause 2, wherein processing the pose information further comprises generating at least one of a mask, a normal map, and a depth map associated with the rendering of the first character.

4. The computer-implemented method according to any of clauses 1-3, further comprising composing the rendering of the first character into a scene based on the at least one of the mask, the normal map, and the depth map.

5. The computer-implemented method according to any of clauses 1-4, wherein the scene comprises an augmented reality (AR) scene.

6. The computer-implemented method of according to any of clauses 1-5, wherein the scene is included within a computer-based game.

7. The computer-implemented method according to any of clauses 1-6, wherein the machine learning model includes a two-dimensional (2D) U-Net architecture adapted to incorporate three-dimensional (3D) information.

8. The computer-implemented method of according to any of clauses 1-7, wherein: the 3D information is processed via layers distinct from the 2D U-Net architecture; and the processed 3D information is used to augment the 2D U-Net architecture via skip connections.

9. The computer-implemented method of according to any of clauses 1-8, wherein the machine learning model is trained based on a perceptual loss between images generated by the machine learning model and associated rendered images included in a set of training data.

10. The computer-implemented method according to any of clauses 1-9, wherein the control signal comprises a joystick signal or a video signal.

11. In some embodiments, a computer-implemented method for training a machine learning model comprises: receiving training data that includes a plurality of rendered images and an associated set of control points for each rendered image; and training the machine learning model based on a perceptual loss between one or more images generated by the machine learning model and one or more associated rendered images included in the training data.

12. The computer-implemented method according to clause 11, wherein each of the associated sets of control points includes a respective rendering of a skeleton.

13. The computer-implemented method according to clause 11 or clause 12, wherein the rendered images depict a character in poses corresponding to poses in the renderings of the skeleton.

14. The computer-implemented method according to any of clauses 11-13, wherein the perceptual loss is defined based on a plurality of layers of a deep neural network trained for classification.

15. The computer-implemented method according to any of clauses 11-14, wherein the perceptual loss is defined as an L1 norm $C(M*I)$ between the images generated by the machine learning model and the corresponding rendered images in the training data, wherein M is a mask, I is an image, and C is a plurality of layers of a pre-trained convolutional neural network.

16. The computer-implemented method according to any of clauses 11-15, wherein training the machine learning model comprises performing one or more adversarial learning operations.

17. The computer-implemented method according to any of clauses 11-16, wherein training the machine learning model is further based on losses defined as L1 norms between normal maps and masks generated by the machine learning model and normal maps and masks included in the training data.

18. The computer-implemented method according to any of clauses 11-17, wherein the training data is generated by: receiving a three-dimensional (3D) model and animation data; posing the 3D model based on the animation data; and rendering the posed 3D model.

19. In some embodiments, a computer-readable storage medium including instructions that, when executed by a processing unit, cause the processing unit to train a machine learning model by performing steps comprising: receiving training data that includes a plurality of rendered images and an associated set of control points for each rendered image; and training the machine learning model based on a perceptual loss between one or more images generated by the machine learning model and one or more associated rendered images included in the training data.

20. The computer-readable storage medium according to clause 19, wherein each of the associated sets of control points includes a respective rendering of a skeleton.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering an image that includes at least one character, the method comprising:
   determining, by one or more computing devices, pose information for a first character based on a control signal; and
   inputting the pose information and three-dimensional (3D) information associated with a 3D model of the first character into a trained machine learning model, wherein the trained machine learning model generates a rendered image of the first character based on the pose information and the 3D information, and wherein the trained machine learning model is trained based on a perceptual loss between images generated by the trained machine learning model and associated rendered images included in a set of training data.

2. The computer-implemented method of claim 1, wherein determining the pose information includes rendering a skeleton.

3. The computer-implemented method of claim 1, wherein generating the rendered image of the first character further comprises generating at least one of a mask, a normal map, or a depth map associated with the rendered image of the first character.

4. The computer-implemented method of claim 3, further comprising composing the rendered image of the first character into a scene based on the at least one of the mask, the normal map, or the depth map.

5. The computer-implemented method of claim 4, wherein the scene comprises an augmented reality (AR) scene.

6. The computer-implemented method of claim 4, wherein the scene comprises a video game scene.

7. The computer-implemented method of claim 1, wherein the trained machine learning model includes a two-dimensional (2D) U-Net architecture configured to incorporate the 3D information.

8. A computer-implemented method for rendering an image that includes at least one character, the method comprising:
   determining, by one or more computing devices, pose information for a first character based on a control signal; and
   inputting the pose information and three-dimensional (3D) information associated with a 3D model of the first character into a trained machine learning model, wherein the trained machine learning model generates a rendered image of the first character based on the pose information and the 3D information, and wherein the trained machine learning model is trained based on a perceptual loss between images generated by the trained machine learning model and associated rendered images included in a set of training data;
   wherein the trained machine learning model includes a two-dimensional (2D) U-Net architecture configured to incorporate the 3D information;
   the 3D information is processed via layers distinct from the 2D U-Net architecture; and the processed 3D information is used to augment the 2D U-Net architecture via skip connections.

9. The computer-implemented method of claim 1, wherein the control signal comprises a joystick signal or a video signal.

10. A computer-implemented method for training a machine learning model, the method comprising:
receiving, by one or more computing devices, training data that includes a plurality of rendered images and an associated set of control points for each rendered image; and
training, by the one or more computing devices, the machine learning model based on a perceptual loss between one or more images generated by the machine learning model and one or more associated rendered images included in the training data.

11. The computer-implemented method of claim 10, wherein each of the associated sets of control points includes a respective rendering of a skeleton.

12. The computer-implemented method of claim 11, wherein the plurality of rendered images depict a character in poses corresponding to poses in the renderings of the skeleton.

13. The computer-implemented method of claim 10, wherein the perceptual loss is defined based on a plurality of layers of a deep neural network trained for classification.

14. The computer-implemented method of claim 13, wherein the perceptual loss is defined as an L1 norm C(M*I) between the one or more images generated by the machine learning model and the one or more associated rendered images in the training data, wherein M is a mask, I is an image, and C is a plurality of layers of the deep neural network trained for classification.

15. The computer-implemented method of claim 10, wherein training the machine learning model comprises performing one or more adversarial learning operations.

16. The computer-implemented method of claim 10, wherein training the machine learning model is further based on losses defined as L1 norms between normal maps and masks generated by the machine learning model and normal maps and masks included in the training data.

17. The computer-implemented method of claim 10, wherein the training data is generated by:
receiving a three-dimensional (3D) model and animation data;
posing the 3D model based on the animation data; and
rendering the posed 3D model.

18. A non-transitory computer-readable storage medium including instructions that, when executed by one or more processors, cause the one or more processors to train a machine learning model by performing steps comprising:
receiving training data that includes a plurality of rendered images and an associated set of control points for each rendered image; and
training the machine learning model based on a perceptual loss between one or more images generated by the machine learning model and one or more associated rendered images included in the training data.

19. The non-transitory computer-readable storage medium of claim 18, wherein each of the associated sets of control points includes a respective rendering of a skeleton.

* * * * *